United States Patent
Seo

(10) Patent No.: US 9,081,489 B2
(45) Date of Patent: Jul. 14, 2015

(54) TOUCH INPUT METHOD AND APPARATUS FOR RECOGNIZING AND DISTINGUISHING FINGER CONTACT ON A TOUCH SENSING SURFACE

(75) Inventor: Hyung-jin Seo, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 533 days.

(21) Appl. No.: 12/940,672

(22) Filed: Nov. 5, 2010

(65) Prior Publication Data

US 2011/0102351 A1    May 5, 2011

(30) Foreign Application Priority Data

Nov. 5, 2009    (KR) .................. 10-2009-0106664

(51) Int. Cl.
*G06F 3/041*    (2006.01)
*G06F 3/0488*    (2013.01)

(52) U.S. Cl.
CPC .................... *G06F 3/0488* (2013.01)

(58) Field of Classification Search
USPC .................................. 345/173–178
See application file for complete search history.

(56) References Cited

U.S. PATENT DOCUMENTS

| | | | | |
|---|---|---|---|---|
| 6,289,107 | B1 * | 9/2001 | Borchers et al. | 382/100 |
| 6,323,846 | B1 * | 11/2001 | Westerman et al. | 345/173 |
| 7,385,592 | B2 * | 6/2008 | Collins | 345/173 |
| 8,130,203 | B2 * | 3/2012 | Westerman | 345/173 |
| 8,154,529 | B2 * | 4/2012 | Sleeman et al. | 345/173 |
| 2006/0026521 | A1 * | 2/2006 | Hotelling et al. | 715/702 |
| 2007/0229477 | A1 | 10/2007 | Ludwig | |
| 2008/0158145 | A1 * | 7/2008 | Westerman | 345/156 |
| 2009/0160792 | A1 * | 6/2009 | Morohoshi et al. | 345/173 |
| 2009/0307589 | A1 * | 12/2009 | Inose et al. | 715/702 |
| 2010/0117961 | A1 * | 5/2010 | Westerman | 345/163 |
| 2010/0139990 | A1 * | 6/2010 | Westerman et al. | 178/18.03 |
| 2011/0012848 | A1 * | 1/2011 | Li et al. | 345/173 |

FOREIGN PATENT DOCUMENTS

JP    2005-301844    10/2005
KR    10-0481220    3/2005

* cited by examiner

*Primary Examiner* — Kathy Wang-Hurst
*Assistant Examiner* — Joseph Fox
(74) *Attorney, Agent, or Firm* — The Farrell Law Firm, P.C.

(57) ABSTRACT

A touch input method includes receiving a touch input signal corresponding to a finger from a touch-sensing device, detecting a contact area between the touch-sensing area and the finger corresponding to the touch input signal received, and if a curvature threshold value below which the contact area is recognizable as a circle, recognizing the finger corresponding to the touch input signal received as a thumb.

20 Claims, 6 Drawing Sheets

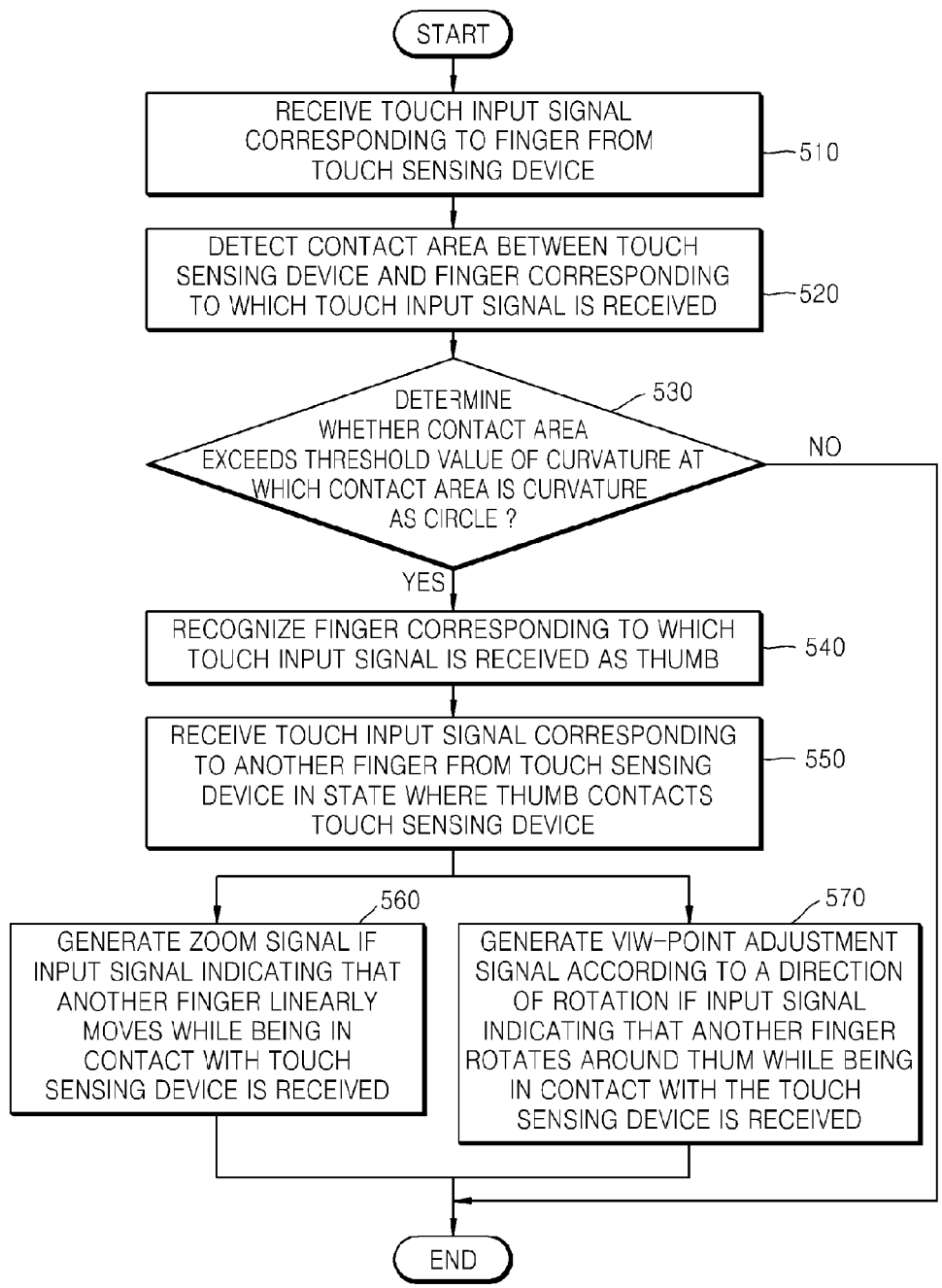

TOUCH INPUT METHOD AND APPARATUS FOR RECOGNIZING AND DISTINGUISHING FINGER CONTACT ON A TOUCH SENSING SURFACE

PRIORITY

This application claims priority under 35 U.S.C. §119 to Korean Patent Application No. 10-2009-0106664, filed on Nov. 5, 2009, in the Korean Intellectual Property Office, the disclosure of which is incorporated herein in its entirety by reference.

BACKGROUND OF THE INVENTION

1. Field of the Invention

The present invention generally relates to a touch input method and apparatus, and more particularly, to a touch input method and apparatus based on contact characteristics between a finger and a touch-sensing surface.

2. Description of the Related Art

Various types of apparatuses employing a display unit including a touch sensor have become widely available in recent years. Several methods of providing an intuitive and easy user interface, using a touch sensor where users perform desired operations by touching a display, included in a small apparatus, have been studied.

SUMMARY OF THE INVENTION

The present invention provides a touch input method and apparatus that recognizes a thumb contact and distinguishes the touch of a left thumb from the touch of a right thumb.

According to one aspect of the present invention, there is provided a touch input method including receiving a touch input signal corresponding to a finger from a touch-sensing device; detecting a contact area between the touch-sensing device and the finger corresponding to the touch input signal received; and if the contact area exceeds a curvature threshold value below which the contact area is recognizable as a circle, recognizing the finger corresponding to the touch input signal received as a thumb.

The touch input method further includes detecting the center of mass of the contact area; and recognizing the thumb as a left thumb or a right thumb, according to asymmetry, by using a line obtained by connecting two boundary points of the contact area farthest from the center of mass as a reference line.

The touch input method further includes recognizing the thumb as a left thumb or a right thumb according to asymmetry by using an axis corresponding to a longest diameter in the contact area as a reference line.

The touch input method further includes, on the assumption that the contact area is divided into left and right halves by the reference line, recognizing the finger corresponding to the touch input signal received as a left thumb, if the area of the left half is greater than the area of the right half, and recognizing the finger corresponding to the touch input signal received as a right thumb if the area of the right half is greater than the area of the left half.

The touch input method further includes displaying a user interface depending on a finger corresponding to the touch input signal.

The touch input method further includes in a state where the thumb contacts the touch-sensing device, receiving a touch input signal corresponding to another finger from the touch-sensing device; and if a received input signal indicates that another finger is linearly moving while being in contact with the touch-sensing device is received, generating a zoom signal.

The touch input method further includes receiving a touch input signal corresponding to another finger from the touch-sensing device in a state where the thumb contacts the touch-sensing device; and if a received input signal indicates that another finger is rotating around the thumb while being in contact with the touch-sensing device, generating a viewpoint adjustment signal according to the direction of the rotation.

According to another aspect of the present invention, there is provided a touch input apparatus including a touch-sensing unit for receiving a touch input signal corresponding to a finger; a contact area detecting unit for detecting a contact area between the touch-sensing unit and the finger corresponding to the touch input signal received; and a control unit for recognizing, if the contact area exceeds a curvature threshold value below which the contact area is recognizable as a circle, the finger corresponding to the touch input signal received as a thumb.

According to another aspect of the present invention, there is provided a computer-readable recording medium having embodied thereon a program for executing a touch input method, wherein the touch input method includes receiving a touch input signal corresponding to a finger from a touch-sensing device; detecting a contact area between the touch-sensing device and the finger corresponding to the touch input signal received; and if the contact area exceeds a curvature threshold value below which the contact area is recognizable as a circle, recognizing the finger corresponding to the touch input signal received as a thumb.

BRIEF DESCRIPTION OF THE DRAWINGS

The above and other features and advantages of the present invention will become more apparent by describing in detail embodiments thereof with reference to the attached drawings in which

FIG. 5 is a flowchart illustrating a touch input method according to another embodiment of the present invention;

DETAILED DESCRIPTION OF EMBODIMENTS OF THE INVENTION

Figure 1:
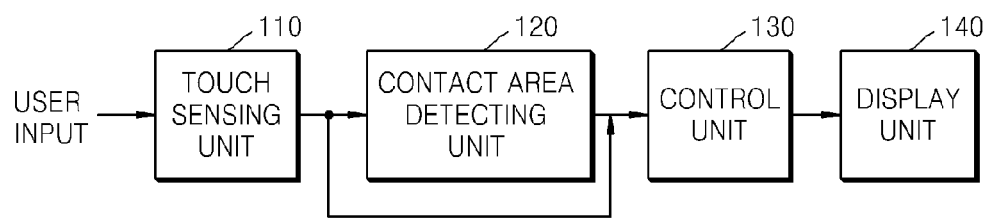
FIG. 1 is a block diagram of a touch input apparatus according to an embodiment of the present invention.

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted for the sake of clarity and conciseness.

FIG. 1 is a block diagram illustrating a touch input apparatus according to an embodiment of the present invention.

Referring to FIG. 1, the touch input apparatus includes a touch-sensing unit 110, a contact area detecting unit 120, a control unit 130, and a display unit 140.

If a user touches the touch-sensing unit 110 with a finger, the touch-sensing unit 110 receives a touch input signal corresponding to the finger. The touch-sensing unit 110 transmits the touch input signal to the contact area detecting unit 120 or the control unit 130. The touch-sensing unit 110 may recognize the location of the touch on a touch-sensing device, e.g., a touch-sensing surface. The touch-sensing unit 110 may be a touchpad or a touch screen, and may use a sensing technology such as a capacity scheme, a resistance scheme, a surface acoustic wave scheme, a pressure scheme, or an optical scheme. However, the present embodiment is not limited thereto.

Additionally, the touch-sensing unit 110 may perform single-point sensing or multi-point sensing. The single-point sensing may distinguish only a single touch, and the multi-point sensing may distinguish simultaneous multiple touches. The touch-sensing unit 110 may be disposed on the display unit 140 or in front of the display unit 140. The touch-sensing unit 110 may be integrated with the display unit 140 or separated from the display unit 140. Also, the touch-sensing unit 110 may sense dragging, that is, movement of a finger while the finger remains in contact with the touch-sensing unit 110.

The contact area-detecting unit 120 detects a contact area between the touch-sensing unit 110 and the finger corresponding to the touch input signal received. If the contact area detected by the contact area detecting unit 120 is greater than or equal to a curvature threshold value below which the contact area is recognizable as a circle, the control unit 130 recognizes the finger corresponding to the touch input signal received as a thumb. In general, when the user physically touches the touch-sensing unit 110 with a thumb, the thumb is laid flat on the touch-sensing unit 110. That is, a lateral surface of the thumb contacts the touch-sensing unit 110. Accordingly, a contact area between the thumb and the touch-sensing unit 110 has a long oval shape having an irregular curvature or a long irregular shape. However, if the user touches the touch-sensing unit 110 with fingers other than the thumb, the fingers contact the touch-sensing unit 110 while being parallel to the touch-sensing unit. In this case, each contact area between the touch-sensing unit 110 and the fingers has a circular shape or an oval shape close to a circle. In FIG. 1, a threshold value may be previously set to be such that if a contact area has an oval shape close to a circle, the contact area is recognized as a circle. The threshold value, suitable for a particular sensing unit, may be obtained by a manufacturer through experimentation. Also, the threshold value may be set by the user, and may be changed according to a user's experimentation. If a contact area has a circular shape or an oval shape close to a circle, the control unit 130 recognizes the contact area as a circle by judging that the contact area is less than the curvature threshold value. Accordingly, if a contact area has a long oval shape with an irregular curvature or an irregular shape, the control unit 130 does not recognize the contact area as a circle by judging that the contact area is equal to or greater than the curvature threshold value. If a contact area is not recognized as a circle, the control unit 130 recognizes that a thumb contacts the touch-sensing device.

While a conventional apparatus for recognizing a thumb by using the difference between an area of a thumb and an area of another finger needs input signals corresponding to at least two finger touches, the touch input apparatus of FIG. 1 may recognize a thumb by using an input signal corresponding to one finger touch. Also, while the conventional apparatus recognizes a thumb according to coordinates of a touch-sensing device, the touch input apparatus of FIG. 1 may recognize a thumb by using only the shape of a contact area between the thumb and the touch-sensing device.

Furthermore, after a thumb is recognized, the control unit 130 may determine whether the thumb is a left thumb or a right thumb based on asymmetry of the contact area between the thumb and the touch-sensing device. One method for determining whether the thumb recognized is a left thumb or a right thumb is based on asymmetry and the assumption that the contact area is divided into left and right halves by an axis corresponding to the longest diameter of the contact area, where the control unit 130 in FIG. 1 determines whether the area of the left half is greater than the area of the right half. If the area of the left half is greater than the area of the right half, control unit 130 determines that a left thumb is touching the touch-sensing device.

Another method for determining whether the recognized thumb is a left thumb or a right thumb is based on asymmetry and the assumption that the contact area is divided into left and right halves by a line obtained by connecting two boundary points farthest from the center of mass of the contact area. Where the control unit determines whether the area of the left half is greater than the area of the right half. A method of determining whether the recognized thumb is a left thumb or a right thumb based on asymmetry is not limited thereto, and may be performed in various ways.

Generally, since the lateral surface of a thumb contacts the touch-sensing device, one side of the contact area is more convex than the other side. Accordingly, if the area of the right half is greater than the area of the left half about a specific reference axis, the control unit 130 recognizes the finger corresponding to the touch input signal received as a right thumb, and if the area of the left half is greater than the area of the right half, control unit 130 recognizes the finger corresponding to the touch input signal received as a left thumb. That is, in FIG. 1, it may be determined whether a finger, corresponding to a touch input signal received, is a thumb, based on a contact area with only one touch of the finger, and if it is determined that the finger is a thumb, it may be determined immediately whether the thumb is a left thumb or a right thumb according to the shape of the contact area. Control unit 130 transmits a signal indicating that a left thumb is recognized or a signal indicating that a right thumb is recognized to the display unit 140.

In a state where a thumb is in contact with the touch-sensing device, the control unit 130 may receive touch input signals corresponding to other fingers from the touch-sensing unit 110. If a received input signal indicates that a thumb and another finger are linearly moving while being in contact with the touch-sensing device, control unit 130 generates a zoom signal. For example, if the received input signal indicates that the thumb and another finger are linearly moving away from each other, control unit 130 generates a zoom-in signal, and if the received input signal indicates that the thumb and another finger are linearly moving closer to each other, the control unit 130 generates a zoom-out signal. Also, if a received input signal indicates that another finger is rotating around the thumb while being in contact with the touch-sensing device, control unit 130 generates a viewpoint adjustment signal according to a direction of the rotation.

The display unit 140 may be a liquid crystal display (LCD). Alternatively, the display unit 140 may be a color graphics adapter (CGA) display, an enhanced graphics adapter (EGA) display, a variable graphics array (VGA) display, a super VGA display, a cathode ray tube (CRT), or the like. However, the present embodiment is not limited thereto. The display unit 140 may be integrated with the touch-sensing unit 110 or separated from the touch-sensing unit 110. If a signal indicating that a left thumb is recognized is received from the control unit 130, the display unit 140 displays a user interface on a left upper end of the display unit 140, and if a signal indicating that a right thumb is recognized is received from the control unit 130, the display unit 140 displays a user interface on a right upper end of the display unit 140. If a zoom-out signal is received from the control unit 130, the display unit 140 reduces objects on a screen, and if a zoom-in signal is received from the control unit 130, the display unit 140 enlarges objects on the screen. If a viewpoint adjustment signal is received from the control unit 130, the display unit 140 adjusts a viewpoint of the screen.

Figure 2:
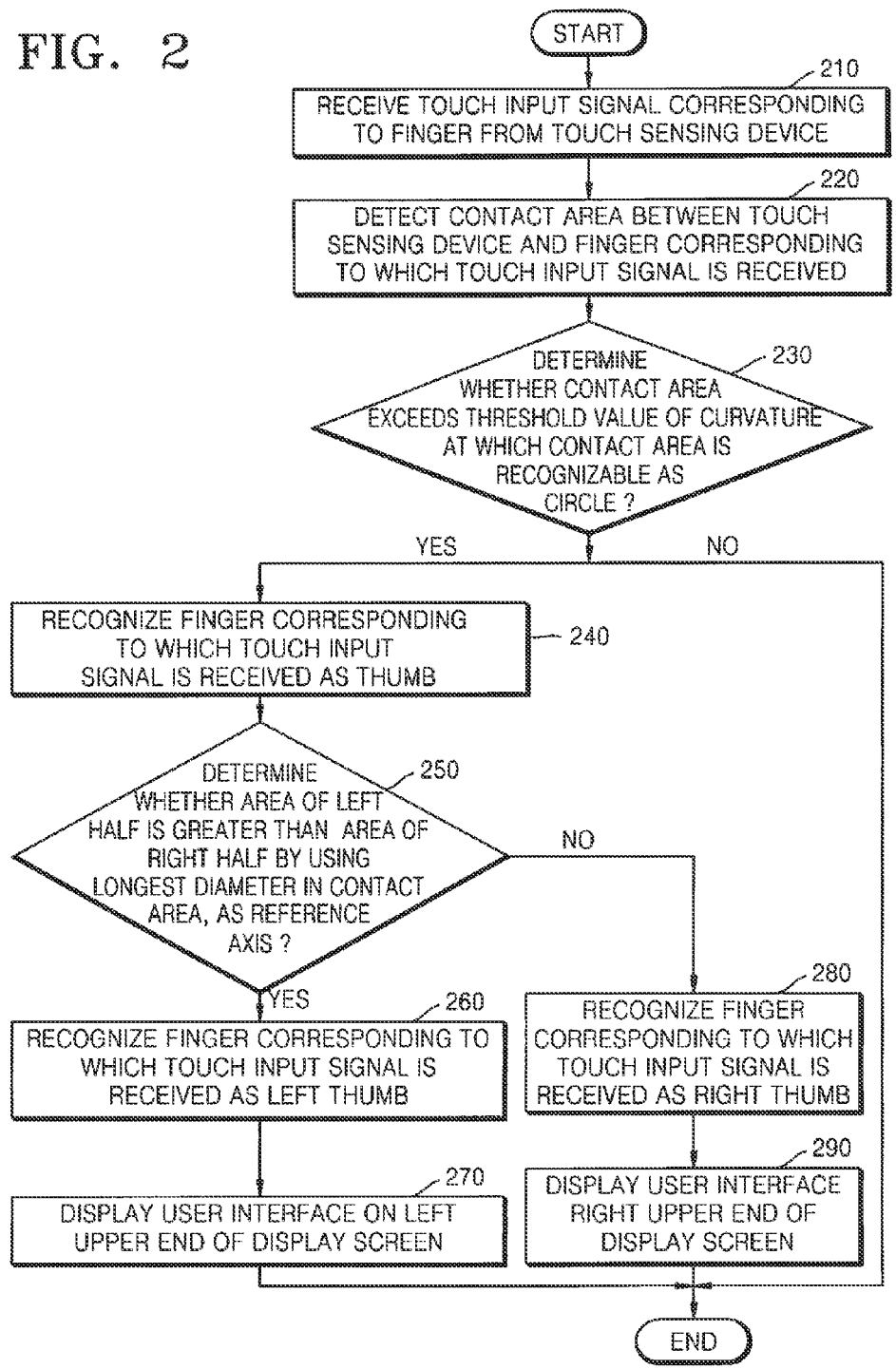
FIG. 2 is a flowchart illustrating a touch input method according to an embodiment of the present invention.

FIG. 2 is a flowchart illustrating a touch input method according to an embodiment of the present invention.

Referring to FIG. 2, in step 210, a touch input apparatus receives a touch input signal corresponding to a finger from a user. A touch-sensing device included in the touch input apparatus may be a touchpad or a touch screen.

Figure 3A:
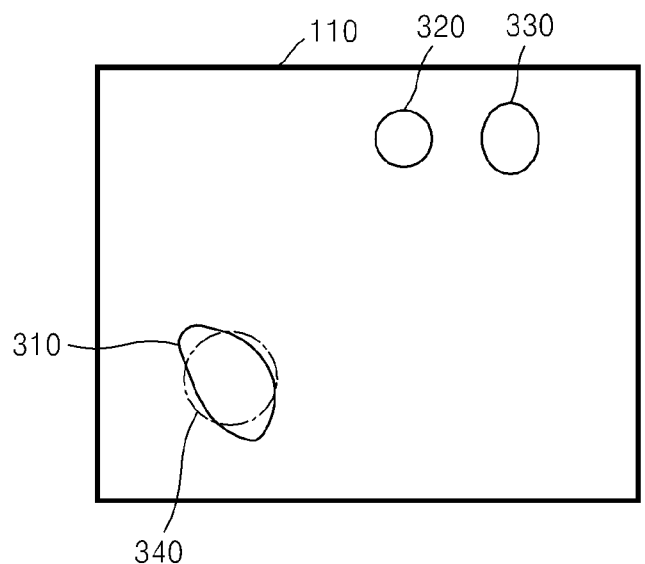
FIGS. 3A and 3B are diagrams illustrating contact areas between fingers and a touch-sensing device.

Steps 220 through 240 will be explained in detail with reference to FIG. 3A. FIG. 3A illustrates contact areas between fingers and the touch-sensing unit 110.

In step 220, the touch input apparatus detects a contact area between the finger corresponding to the touch input signal received from the user and the touch-sensing device. In FIG. 3A, contact areas 310, 320, and 330 for three fingers are shown.

In step 230, the touch input apparatus determines whether the contact area is greater than a curvature threshold value below which the contact area is recognizable as a circle. If it is determined that the contact area is greater than or equal to the curvature threshold value, the touch input method proceeds to step 240 in which the finger corresponding to the touch input signal received is recognized as a thumb. If it is determined that the contact area is less than the curvature threshold value, the finger is not recognized as a thumb and the touch input method ends.

In general, when a user touches a touch-sensing device with a thumb, a lateral surface of the thumb contacts the touch-sensing device. Accordingly, a contact area between the thumb and the touch-sensing device has a long oval shape with an irregular curvature or a long irregular shape. However, if the user touches the touch-sensing device with fingers other than a thumb, each contact area between the fingers and the touch-sensing device has a circular shape or an oval shape close to a circle. In FIG. 2, a threshold value is set to be such that an oval shape close to a circle is recognized as a circle. The threshold value, suitable for a particular sensing unit, may be obtained by a manufacturer through experimentation. Also, the threshold value may be set by a user, and may be changed according to a user's experimentation. If a contact area has a circular shape or an oval shape close to a circle, the touch input apparatus recognizes the contact area as a circle by judging that the contact area is less than the curvature threshold value. Accordingly, if a contact area has a long oval shape with an irregular curvature or an irregular shape, the touch input apparatus does not recognize the contact area as a circle by judging that the contact area is greater than or equal to the curvature threshold value. If a contact area is not recognized as a circle, the touch input apparatus recognizes that a thumb contacts the touch-sensing device. Referring to FIG. 3A, contact area 310 between a thumb and the touch-sensing unit 110 has a long oval shape with an irregular curvature. A threshold area 340 that determines whether a contact area 310 is a circle is placed over the contact area 310. The contact area 310 of a thumb exceeds the threshold area 340. Also, each contact area 320 and 330 between two fingers other than a thumb and the touch-sensing unit 110 has a circular shape or an oval shape close to a circle.

In step 250, the touch input apparatus may recognize the thumb recognized as a left thumb or a right thumb based on asymmetry of the contact area between the thumb and the touch-sensing device. On the assumption that the contact area is divided into left and right halves by a line obtained by connecting two boundary points farthest from the center of mass of the contact area or by an axis corresponding to a longest diameter of the contact area, it is determined whether the area of the left half is greater than the area of the right half. If it is determined that the area of the left half is greater than the area of the right half, the touch input method proceeds to step 260, and if it is determined that the area of the right half is greater than the area of the left half, the touch input method proceeds to step 280. In general, since a lateral surface of a thumb contacts a touch-sensing device, one side of a contact area is more convex than another side.

In step 260, if the area of the left half is greater than the area of the right half about the reference axis, the touch input apparatus recognizes the finger corresponding to the touch input signal received as a left thumb.

In step 270, if the finger corresponding to the touch input signal received is recognized as a left thumb, a user interface is displayed on a left upper end of a display screen that is integrated with or separated from the touch-sensing device.

In step 280, if the area of the right half is greater than the area of the left half about the reference axis, the touch input apparatus recognizes the finger corresponding to the touch input signal received as a right thumb.

In step 290, if the finger corresponding to the touch input signal received is recognized as a right thumb, a user interface is displayed on a right upper end of the display screen.

Figure 3B:
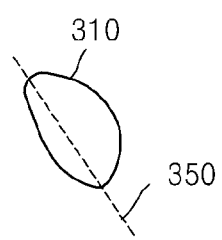

A further explanation will be made with reference to FIG. 3B. FIG. 3B illustrates the contact area 310 between a thumb and the touch-sensing unit 110 in FIG. 3A. The contact area 310 marked by a solid line is a contact area between a thumb and the touch-sensing unit 100, and a dotted line 350 shows a reference axis corresponding to a longest diameter in the contact area 310. In FIG. 3B, a right side is more convex than a left side about the reference axis 350. That is, the area of a right half is greater than the area of a left half. In this case, it is determined that a right thumb touches the touch-sensing device. In contrast, if the area of the left half is greater than the area of the right half, it is determined that a left thumb touches the touch-sensing device.

If a user touches a touch-sensing device with a left or right thumb, and then an interface, for example, an icon, is displayed on a left or right upper end, the user may easily use another finger to touch the icon without moving a hand. If the user interface is displayed on the left or right upper end, the user may make a single-point touch on the user interface in a state where the thumb is off of the touch-sensing device. Also, the user may make a multi-point touch on the user interface in a state where the thumb contacts the touch-sensing device as well.

Figure 4A:
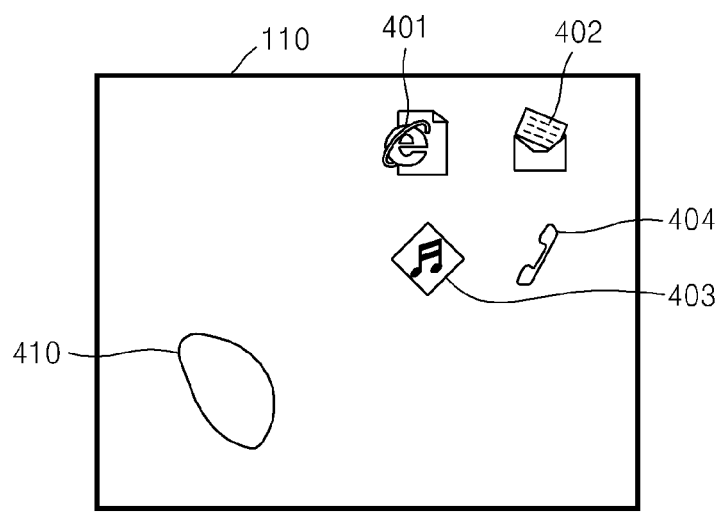
FIGS. 4A and 4B are diagrams illustrating user interfaces according to an embodiment of the present invention.
Figure 4B:
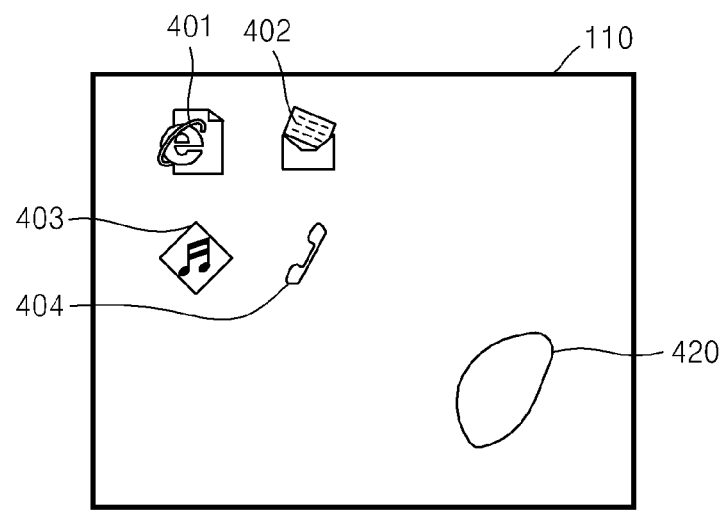

FIGS. 4A and 4B illustrate user interfaces according to an embodiment of the present invention.

FIG. 4A illustrates that if the user touches the touch-sensing device with a right thumb 410, user interfaces, for example, application execution icons 401 through 404, are displayed on a right upper end of the touch-sensing unit 110, which may be a display screen, and likewise, if the user touches the touch-sensing device with a left thumb 420 as in FIG. 4B, the application execution icons 401 through 404 are displayed on a left upper end of the display screen 110.

FIG. 5 is a flowchart illustrating a touch input method according to another embodiment of the present invention.

Referring to FIG. 5, steps 510 through 540 are the same as steps 210 through 240 of FIG. 2, and thus an explanation thereof will not be given.

In step 550, the touch input apparatus receives a touch input signal corresponding to another finger from the user in a state where a thumb contacts the touch-sensing device. The touch input signal corresponding to another finger may mean a touch input signal corresponding to a finger other than the thumb. For example, in a state where a left thumb is first recognized and then contacts the touch-sensing device, if the user touches the touch-sensing device with a right thumb, the right thumb is not recognized as a thumb.

In step 560, if a received input signal indicates that the thumb and another finger are linearly moving while being in contact with the touch-sensing device, the touch input apparatus generates a zoom signal. If a received input signal indicates that the thumb and another finger are linearly moving away from each other, the touch input apparatus generates a zoom-in signal, and if a received input signal indicates that the thumb and another finger are linearly moving toward each other, the touch input apparatus generates a zoom-out signal. If a zoom-in signal is received, the touch input apparatus may enlarge objects on a current display screen, and if a zoom-out signal is received, the touch input apparatus may reduce objects on the current display screen.

Figure 6:
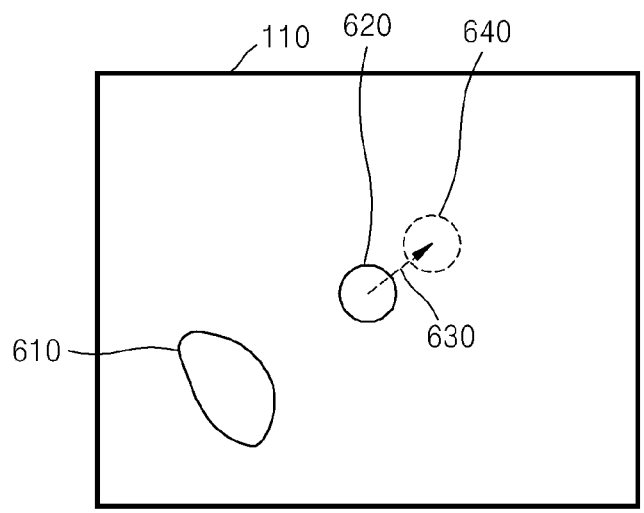
FIG. 6 is a diagram illustrating a touch input method of generating a zoom signal according to an embodiment of the present invention.

FIG. 6 illustrates a touch input method of generating a zoom signal according to an embodiment of the present invention.

Referring to FIG. 6, since a right side of a contact area 610 of a thumb is more convex than a left side thereof, it is determined that a right thumb touches the touch-sensing device. In this case, the right thumb becomes a reference finger. If a contact area 620 of another finger is linearly dragged in a direction 630 away from the contact area 610 of the right thumb to become a contact area 640, the touch input apparatus generates a zoom-in signal and enlarges objects on a display screen.

In operation 570, if a received input signal indicates that another finger is rotating around the thumb while being in contact with the touch-sensing device, the touch input apparatus generates a viewpoint adjustment signal according to a direction of the rotation. Also, in the case of a three-dimensional (3D) interface, three axes may be adjusted according to a direction of the rotation.

Figure 7:
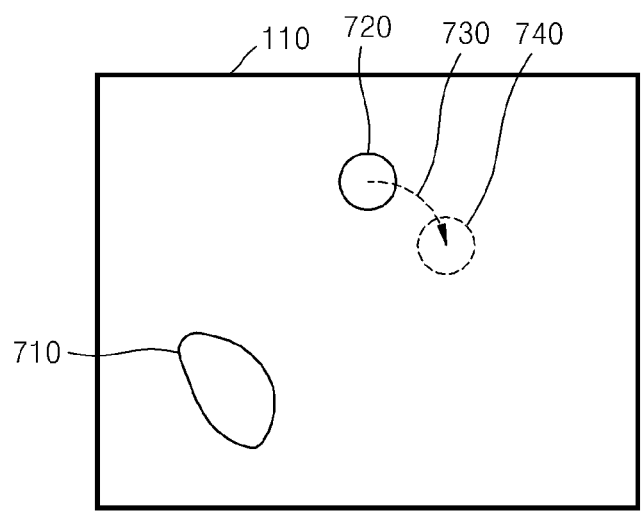
FIG. 7 is a diagram illustrating a touch input method of generating a viewpoint adjustment signal according to an embodiment of the present invention.

FIG. 7 is a view illustrating a touch input method of generating a viewpoint adjustment signal according to an embodiment of the present invention.

Referring to FIG. 7, since a right side of a contact area 710 of a thumb is more convex than a left side thereof, it is determined that a right thumb touches the touch-sensing device. In this case, the right thumb becomes a reference finger. If a contact area 720 of another finger is dragged in a direction 730 around the contact area 710 of the right thumb to become a contact area 740, the touch input apparatus generates a viewpoint adjustment signal.

The touch input method as described above may be embodied as computer-readable codes in a computer-readable recording medium. The computer-readable recording medium may be any recording apparatus capable of storing data that is read by a computer system. Examples of the computer-readable recording medium include read-only memories (ROMs), random-access memories (RAMs), CD-ROMs, magnetic tapes, floppy disks, and optical data storage devices. The computer readable medium may be distributed among computer systems that are interconnected through a network, and the present invention may be stored and implemented as computer readable codes in the distributed system. Functional programs, codes, and code segments for embodying the present invention may be easily derived by programmers in the technical field to which the present invention pertains.

Although the present invention has been particularly shown and described with reference to embodiments thereof, the embodiments have been used to explain the present invention and should not be construed as limiting the scope of the present invention defined by the claims. The preferred embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A touch input method comprising:
   receiving a touch input signal corresponding to a finger from a touch-sensing device;
   detecting a contact area between the touch-sensing device and the finger corresponding to the received touch input signal; and
   recognizing the finger corresponding to the received touch input signal based on a curvature value of the contact area and an axis corresponding to a longest diameter in the contact area as a reference line,
   wherein the reference line asymmetrically divides the contact area into a left half area and a right half area, and
   wherein the finger is recognized as a left thumb or a right thumb by comparing a size of the left half area and a size of the right half area.

2. The touch input method of claim 1, wherein the finger is recognized as the right thumb if the right half area is greater than the left half area, and
   wherein the finger is recognized as the left thumb if the left half area is greater than the right half area.

3. The touch input method of claim 2, further comprising:
   receiving a touch input signal corresponding to another finger from the touch-sensing device in a state where the recognized right thumb contacts the touch-sensing device; and
   generating a viewpoint adjustment signal according to a direction of rotation, if a received input signal indicates that the another finger is rotating around the recognized right thumb while being in contact with the touch-sensing device.

4. The touch input method of claim 2, further comprising:
   receiving a touch input signal corresponding to another finger from the touch-sensing device, in a state where the recognized right thumb contacts the touch-sensing device; and
   generating a zoom signal if a received input signal indicates that the another finger is linearly moving while being in contact with the touch-sensing device,
   wherein generating the zoom signal comprises one of generating a zoom-out signal and generating a zoom-in signal, with the zoom-out signal generated if a received input signal indicates that the another finger is moving closer to the recognized right thumb while being in contact with the touch-sensing device, and the zoom-in signal generated if a received input signal indicates that another finger is moving farther away from the recognized right thumb while being in contact with the touch-sensing device.

5. The touch input method of claim 1, further comprising, displaying a user interface on a left upper end of the display from the touch input signal of the left thumb, when the finger corresponding to the touch input signal received is recognized as the left thumb.

6. The touch input method of claim 1, further comprising, displaying a user interface on a right upper end of the display from the touch input signal of the right thumb, when the finger corresponding to the touch input signal received is recognized as the right thumb.

7. The touch input method of claim 1, further comprising:
receiving a touch input signal corresponding to another finger from the touch-sensing device, in a state where the recognized left thumb contacts the touch-sensing device; and
generating a zoom signal if a received input signal indicates that the another finger is linearly moving while being in contact with the touch-sensing device.

8. The touch input method of claim 7, wherein generating the zoom signal comprises generating a zoom-out signal if a received input signal indicates that the another finger is moving closer to the recognized left thumb while being in contact with the touch-sensing device.

9. The touch input method of claim 7, wherein generating the zoom signal comprises generating a zoom-in signal if a received input signal indicates that another finger is moving farther away from the recognized left thumb while being in contact with the touch-sensing device.

10. The touch input method of claim 1, further comprising:
receiving a touch input signal corresponding to another finger from the touch-sensing device in a state where the recognized left thumb contacts the touch-sensing device; and
generating a viewpoint adjustment signal according to a direction of rotation, if a received input signal indicates that the another finger is rotating around the recognized left thumb while being in contact with the touch-sensing device.

11. A touch input apparatus comprising:
a touch-sensing unit configured to receive a touch input signal corresponding to a finger;
a contact area detecting unit configured to detect a contact area between the touch-sensing unit and the finger corresponding to the received touch input signal; and
a control unit configured to recognize the finger corresponding to the received touch input signal based on a curvature value of the contact area and an axis corresponding to a longest diameter in the contact area as a reference line,
wherein the reference line asymmetrically divides the contact area into a left half area and a right half area, and
wherein the finger is recognized as a left thumb or a right thumb by comparing a size of the left half area and a size of the right half area.

12. The touch input apparatus of claim 11, wherein the finger is recognized as the right thumb if the right half area is greater than the left half area, and
wherein the finger is recognized as the left thumb if the left half area is greater than the right half area.

13. The touch input apparatus of claim 12, wherein a touch input signal is received corresponding to another finger from the touch-sensing unit in a state where the recognized right thumb contacts the touch-sensing unit, and
wherein a viewpoint adjustment signal is generated according to a direction of rotation, if a received input signal indicates that the another finger is rotating around the recognized right thumb while being in contact with the touch-sensing unit.

14. The touch input apparatus of claim 11, further comprising, if the control unit recognizes the finger corresponding to the touch input signal received as the left thumb, a display unit configured to display the user interface on a left upper end of the display from the touch input signal of the left thumb.

15. The touch input apparatus of claim 11, further comprising, if the control unit recognizes the finger corresponding to the touch input signal received as the right thumb, a display unit configured to display the user interface on a right upper end of the display from the touch input signal of the right thumb.

16. The touch input apparatus of claim 11, wherein the touch-sensing unit receives a touch input signal corresponding to another finger in a state where the recognized left thumb contacts the touch-sensing unit, and
the control unit generates a zoom signal if the touch-sensing unit receives an input signal indicating that the another finger is linearly moving while being in contact with the touch-sensing unit.

17. The touch input apparatus of claim 16, wherein, if the touch-sensing unit receives an input signal indicating that the another finger is moving closer to the recognized left thumb while being in contact with the touch-sensing unit, the control unit generates a zoom-out signal, and
wherein, if the touch-sensing unit receives an input signal indicating that the another finger is moving farther away from the recognized left thumb while being in contact with the touch-sensing unit, the control unit generates a zoom-in signal.

18. The touch input apparatus of claim 11,
wherein the touch-sensing unit receives a touch input signal corresponding to another finger in a state where the recognized right thumb contacts the touch-sensing unit,
wherein the control unit generates a zoom signal if the touch-sensing unit receives an input signal indicating that the another finger is linearly moving while being in contact with the touch-sensing unit,
wherein, if the touch-sensing unit receives an input signal indicating that the another finger is moving closer to the recognized right thumb while being in contact with the touch-sensing unit, the control unit generates a zoom-out signal, and
wherein, if the touch-sensing unit receives an input signal indicating that the another finger is moving farther away from the recognized right thumb while being in contact with the touch-sensing unit, the control unit generates a zoom-in signal.

19. The touch input apparatus of claim 11, wherein the touch-sensing unit receives a touch input signal corresponding to another finger in a state where the recognized left thumb contacts the touch-sensing unit, and
if the touch-sensing unit receives an input signal indicating that the another finger is rotating around the recognized left thumb while being in contact with the touch-sensing unit, the control unit generates a viewpoint adjustment signal according to a direction of the rotation.

20. A non-transitory computer-readable recording medium having embodied thereon a program configured to execute a touch input method,
wherein the touch input method comprises:
receiving a touch input signal corresponding to a finger from a touch-sensing device;

detecting a contact area between the touch-sensing device and the finger corresponding to the received touch input signal; and recognizing the finger corresponding to the received touch input signal based on a curvature value of the contact area and an axis corresponding to a longest diameter in the contact area as a reference line, wherein the reference line asymmetrically divides the contact area into a left half area and a right half area, and wherein the finger is recognized as one or a left thumb and a right thumb if the left half area is greater than the right half area or if the right half area is greater than the left half area, respectively.

* * * * *